(12) United States Patent
Zheng et al.

(10) Patent No.: US 10,877,574 B2
(45) Date of Patent: Dec. 29, 2020

(54) COMPUTER MOUSE, TOUCHPAD, INPUT SUITE, AND MOBILE DEVICE

(71) Applicants: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., Taiwan (CN)

(72) Inventors: Yongping Zheng, Shanghai (CN); Shih-Kuang Tsai, Shanghai (CN); Jing-song Chang, Taiwan (CN)

(73) Assignees: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., Taiwan (CN)

( * ) Notice: Subject to any disclaimer, the term of this patent is extended or adjusted under 35 U.S.C. 154(b) by 0 days.

(21) Appl. No.: 16/476,581

(22) PCT Filed: Jan. 9, 2017

(86) PCT No.: PCT/CN2017/070645
§ 371 (c)(1),
(2) Date: Jul. 9, 2019

(87) PCT Pub. No.: WO2018/126478
PCT Pub. Date: Jul. 12, 2018

(65) Prior Publication Data
US 2019/0369751 A1    Dec. 5, 2019

(51) Int. Cl.
*G06F 3/0354* (2013.01)
*G06K 9/00* (2006.01)

(52) U.S. Cl.
CPC ..... *G06F 3/03543* (2013.01); *G06K 9/00013* (2013.01)

(58) Field of Classification Search
CPC ................... G06F 3/03543; G06K 9/00013
See application file for complete search history.

(56) References Cited

U.S. PATENT DOCUMENTS 5,991,431 A    11/1999  Borza et al.
2017/0329947 A1*  11/2017  Liu .................... G06F 21/32

FOREIGN PATENT DOCUMENTS

CN    1466033 A  *  1/2004  ........... G06F 3/0235
CN    1466033 A       1/2004
(Continued)

OTHER PUBLICATIONS

The Internet Search Report for PCT application No. PCT/CN20171070645.
The TW1OA issued Nov. 27,2018 by the TW Office.

*Primary Examiner* — Kenneth B Lee, Jr.
(74) *Attorney, Agent, or Firm* — Yunling Ren

(57) ABSTRACT

A computer mouse includes at least one first fingerprint recognition device disposed on an outside surface of the computer mouse, and configured to recognize fingerprint data; and an output converting unit connected to the first fingerprint recognition device, wherein a mapping relation of a plurality of fingerprint data and a plurality of output characters is pre-stored in the output converting unit, and one of the output characters is outputted, by the output converting unit, in response to the received fingerprint data coming from the first fingerprint recognition device.

15 Claims, 19 Drawing Sheets

(56) References Cited

FOREIGN PATENT DOCUMENTS

| | | | | |
|---|---|---|---|---|
| CN | 102193659 | A | | 9/2011 |
| CN | 103064505 | A | * | 4/2013 |
| CN | 103064505 | A | | 4/2013 |
| CN | 203217493 | U | | 9/2013 |
| CN | 105094237 | A | | 11/2015 |
| CN | 105159480 | A | | 12/2015 |
| CN | 105389502 | A | | 3/2016 |
| KR | 20030047620 | A | | 6/2003 |
| TW | 201201086 | A | | 1/2012 |
| TW | 201305853 | A | | 2/2013 |
| TW | M458615 | U | | 8/2013 |
| TW | 201500980 | A | | 1/2015 |

* cited by examiner

US 10,877,574 B2

COMPUTER MOUSE, TOUCHPAD, INPUT SUITE, AND MOBILE DEVICE

CROSS REFERENCE

This application is based upon and claims the benefit of priority of PCT International Patent Applications No. PCT/CN2017/070645, filed on Jan. 9, 2017, the entire contents thereof are incorporated herein by reference.

TECHNICAL FIELD

The present disclosure relates to the field of input devices technology, specifically to a computer mouse, a touchpad, an input suite and a mobile device which are capable of outputting information of letters, numbers, symbols, emojis, and formulas in response to different fingerprints.

BACKGROUND

The increasing popularity of electronic products has become an indispensable part of life and work. The most important input methods for human-computer interaction are also available, which include speech recognition, handwriting, (soft and hard) keyboard input, etc. In terms of efficiency and convenience, finger tapping (soft and hard) keyboard is currently the most popular input method. The character input device on the market, including various soft and hard keyboards. All of them have fixed definitions of characters on the keyboard keys, and the relative positions are fixed. The input of the corresponding keyboard characters or codes is implemented by the human hand, for familiar to the position of the key position, but such input methods and systems have the following defects.

The keyboard key position and code are fixed. When fingers are tapping, the hand needs to familiar the keyboard key position. It takes a long practice fingering to let each finger familiar the physical position of the corresponding key, so that it can be used skillfully.

When the keyboard is replaced, especially for some (soft) keyboard has limited space, the user has input errors caused by a tap position deviation.

SUMMARY

In the light of the problems in the prior art, an object of the present disclosure is to provide a computer mouse, a touchpad, an input suite, and a mobile device that are convenient for the user to easily use.

In some embodiments of the present disclosure, a computer mouse includes at least one first fingerprint recognition device disposed on an outside surface of the computer mouse and configured to recognize fingerprint data; and an output converting unit connected to the first fingerprint recognition device, a mapping relations of a plurality of fingerprint data and a plurality of output characters is pre-stored in the output converting unit and one of the output characters is outputted, by the output converting unit, in response to the received fingerprint data coming from the first fingerprint recognition device.

In some embodiments of the present disclosure, a touchpad includes at least one touch-detection-and-fingerprint-recognition device disposed on an outer surface of the touchpad, wherein the touch-detection and fingerprint-recognition device is configured to recognize fingerprint data and detect touch motion information and the touch motion information is used as a moving track of the cursor; and an output converting unit connected to a first fingerprint recognition device of the touch-detection and fingerprint-recognition device, wherein the output converting unit pre-stores a mapping relation of a plurality of fingerprint data and a plurality of output characters, wherein one of the output characters is outputted by the output converting unit in response to the received fingerprint data coming from the first fingerprint recognition device.

In some embodiments of the present disclosure, an input suite comprises a keyboard and a computer mouse, wherein the computer mouse comprises at least one first fingerprint recognition device disposed on an outside surface of the computer mouse and configured to recognize fingerprint data, and an output converting unit connected to the first fingerprint recognition device, wherein a mapping relation of a plurality of fingerprint data and a plurality of output characters is pre-stored in the output converting unit, and an output character is outputted, by the output converting unit, in response to the received fingerprint data coming from the first fingerprint recognition device; and wherein the keyboard is configured to output a portion of English letters and the computer mouse is configured to output the remaining portion of the English letters and/or all numeric numbers in response to different fingerprints.

In order to further understand the features and technical contents of the present disclosure please refer to the following detailed description and drawings related to the present disclosure. However, the detailed description and the drawings are merely illustrative of the disclosure and are not intended to limit the scope of the claims.

BRIEF DESCRIPTION OF THE DRAWINGS

Embodiments of the present disclosure will now be described, by way of example only, with reference to the accompanying schematic drawings in which corresponding reference symbols indicate corresponding parts, and in which.

DETAILED DESCRIPTION

In the following, embodiments of the present disclosure will be described in detail referring to figures. The concept and its realizations of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to the technicians in the art fully. Same reference signs in the figures refer to same or similar structures, so repeated description of them will be omitted.

As we all know, the fingerprint of each finger is unique, and fingerprint recognition has been used in many security fields. The fingerprint of each finger is unique, and fingerprint recognition has been used in many security fields. Each of the fingerprints represents a code. It will be a change to input method if a mapping relation between the code and a character is established. Everyone is able to carry a "keyboard" specifically designed for them and the design of the "keyboard" is able to be dynamically adjusted to meet individual requirements.

By collecting the fingerprint of the user, a fingerprint pattern, including the fingerprint ridge and the fingerprint valley, is obtained. The fingerprint ridge is the lines of the fingerprint pattern, and the space between the lines is the fingerprint ridge. Therefore, the real fingerprint of the user is recognized by recognizing the fingerprint ridge and the fingerprint valley in the fingerprint pattern.

Figure 1:
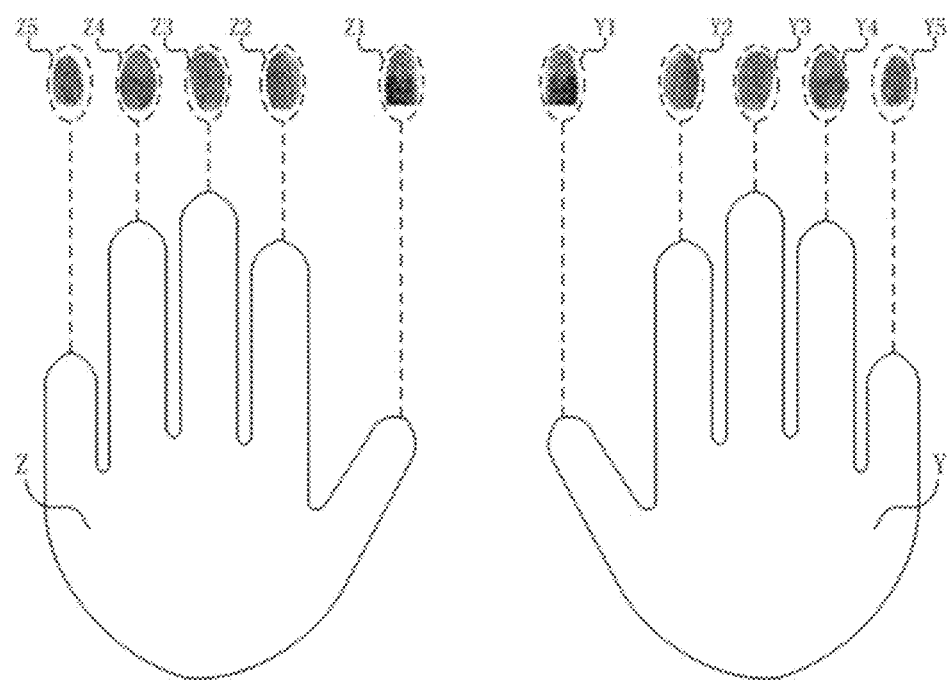
FIG. 1 shows a schematic view of fingerprints of ten fingers of an user of one embodiment of the present disclosure.

FIG. 1 shows a schematic view of fingerprints of ten fingers of a user of one embodiment of the present disclosure. As shown in FIG. 1, from left to right, a fingerprint pattern Z5 is a fingerprint of the little finger of the left hand of the user. A fingerprint pattern Z4 is a fingerprint of the ring finger of the left hand of the user. A fingerprint pattern Z3 is a fingerprint of the middle finger of the left hand of the user. A fingerprint Z2 is a fingerprint of the index finger of the left hand of the user. A fingerprint Z1 is a fingerprint of the thumb finger of the left hand of the user. A fingerprint Y1 is a fingerprint of the thumb finger of the right hand of the user. A fingerprint Y2 is a fingerprint of the index finger of the right hand of the user. A fingerprint Y3 is a fingerprint of the middle finger of the right hand of the user. A fingerprint Y4 is a fingerprint of the ring finger of the right hand of the user. A fingerprint Y5 is a fingerprint of the little finger of the right hand of the user. Before using the computer mouse of the present invention, it is necessary to first enter the fingerprint of the user and set a unique output character corresponding to each fingerprint in the designated area of the computer mouse.

Figure 2:
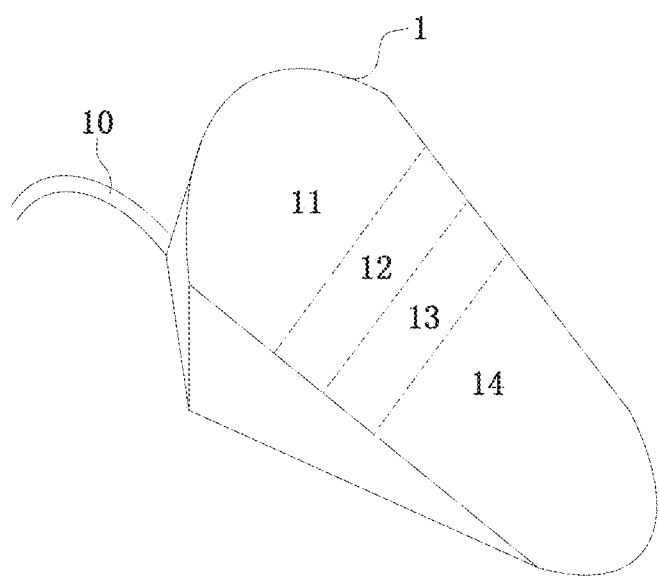
FIG. 2 shows a perspective view of a computer mouse of a first embodiment of the present disclosure.
Figure 3:
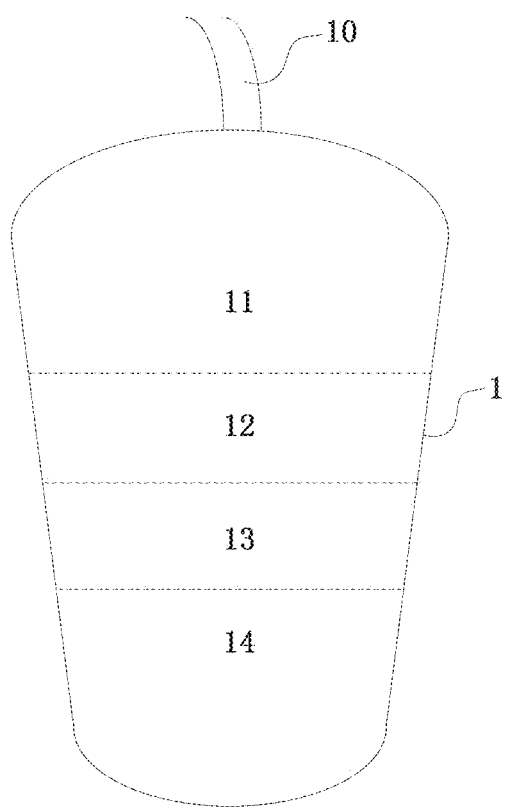
FIG. 3 shows a top view of the computer mouse of the first embodiment of the present disclosure.
Figure 4:
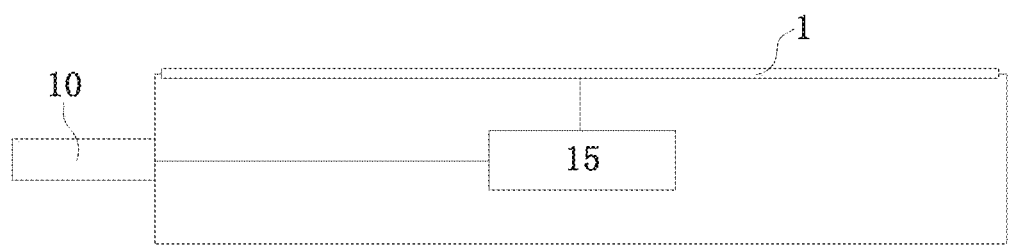
FIG. 4 shows a schematic view of connections of modules of the computer mouse of the first embodiment of the present disclosure.

FIG. 2 shows a perspective view of a computer mouse of a first embodiment of the present disclosure. FIG. 3 shows a top view of the computer mouse of the first embodiment of the present disclosure. FIG. 4 shows a schematic view of connections of modules of the computer mouse of the first embodiment of the present disclosure. As shown in FIGS. 2 to 4, in some embodiments of the present disclosure, a computer mouse is provided. The computer mouse includes at least one first finger print recognition device 1 and an output converting unit 15. The first finger print recognition device 1 is disposed on the outside surface of the computer mouse and the first fingerprint recognition device 1 is configured to recognize fingerprint data. The output converting unit 15 is connected to the first fingerprint recognition device 1. A mapping relation of a plurality of fingerprint data and a plurality of output characters is pre-stored in the output converting unit 15. An output character is outputted, by the output converting unit 15, in response to the received fingerprint data coming from the first fingerprint recognition device 1. The output character includes at least one of letters, numbers, symbols, emojis, and formulas.

The output converting unit 15, as shown in FIG. 1, pre-stores at least one of fingerprint patterns of the fingerprint pattern Z5 (the fingerprint of the little finger of the left hand of the user), the fingerprint pattern Z4 (the fingerprint of the ring finger of the left hand of the user), the fingerprint pattern Z3 (the fingerprint of the middle finger of the left hand of the user), the fingerprint Z2 (the fingerprint of the index finger of the left hand of the user), the fingerprint Z1 (the fingerprint of the thumb finger of the left hand of the user), the fingerprint Y1 (the fingerprint of the thumb finger of the right hand of the user), the fingerprint Y2 (the fingerprint of the index finger of the right hand of the user), the fingerprint Y3 (the fingerprint of the middle finger of the right hand of the user), the fingerprint Y4 (the fingerprint of the ring finger of the right hand of the user), and the fingerprint Y5 (the fingerprint of the little finger of the right hand of the user). Moreover, the output converting unit 15 further pre-stores output characters corresponding to the fingerprint patterns. When the first fingerprint recognition device 1 of the computer mouse collects a fingerprint matched the pre-stored fingerprint pattern, the computer mouse then output a unique output character corresponding to the matched fingerprint pattern. In this embodiment, the first fingerprint recognition device 1 is preferably disposed on an upper surface of the computer mouse, which means an area, naturally pressed, of the upper portion, grasped by the finger and the hand, of the computer mouse when the computer mouse is held but is not limited thereto.

In this embodiment, the computer mouse includes a wired computer mouse connected to other electronic devices through a cable wire 10. The computer mouse is configured to output the output character corresponding to the fingerprint pattern but is not limited thereto. In this embodiment, the first fingerprint recognition device 1 includes a capacitive press-type fingerprint recognition device having an array with multilayer electrodes. A fingerprint ridge or a fingerprint valley of a portion of the fingerprint, received by a point of the array, is determined in response to the strength of the capacitance value between the electrodes of each point of the array. A complete fingerprint is then obtained by information collected by the points of the array but is not limited thereto. In this embodiment, the first fingerprint recognition device 1 includes a fingerprint recognition device that has been invented or will be invented in the future, such as an ultrasonic fingerprint recognition device or a Micro-Electro-Mechanical System (MEMS) recognition device. In the present disclosure, the capacitive press type fingerprint recognition device includes a plurality of fingerprint contacting areas. The output converting unit 15 pre-stores a mapping relation of the output character and at least one fingerprint data of each of the fingerprint contacting areas. Each of the fingerprint data of each of the fingerprint contacting areas is corresponding to a unique output character.

In this embodiment, by simulating the output of a keypad (a numeric keypad) with the press-type fingerprint recognition device of the computer mouse, the press-type fingerprint recognition device includes a plurality of fingerprint contacting areas arranged alone a direction in length of the computer mouse. The press-type fingerprint recognition device includes four fingerprint contacting areas arranged alone a direction in length of the computer mouse from one side to another side.

The press-type fingerprint recognition device includes a first fingerprint contacting area 11, a second fingerprint contacting area 12, a third fingerprint contacting area 13 and a fourth fingerprint contacting area 14 but is not limited thereto. In one preferred embodiment, the fingerprint of the user is recognized by the press-type fingerprint recognition device once the user press any position of a first fingerprint contacting area 11, a second fingerprint contacting area 12, a third fingerprint contacting area 13, and a fourth fingerprint contacting area 14. In the present disclosure, the number of fingerprint contacting area arranged in the length direction is increased/decreased in response to actual needs, and the number of output characters is not limited thereto.

In some embodiments, the first fingerprint recognition device 1 further includes touch control recognition functions. The user is capable of performing conventional operations of the computer mouse, such as clicking and sliding on the surface of the touch detection and fingerprint recognition device, and even multi-touch gesture operations, which will not be described herein.

Figure 5:
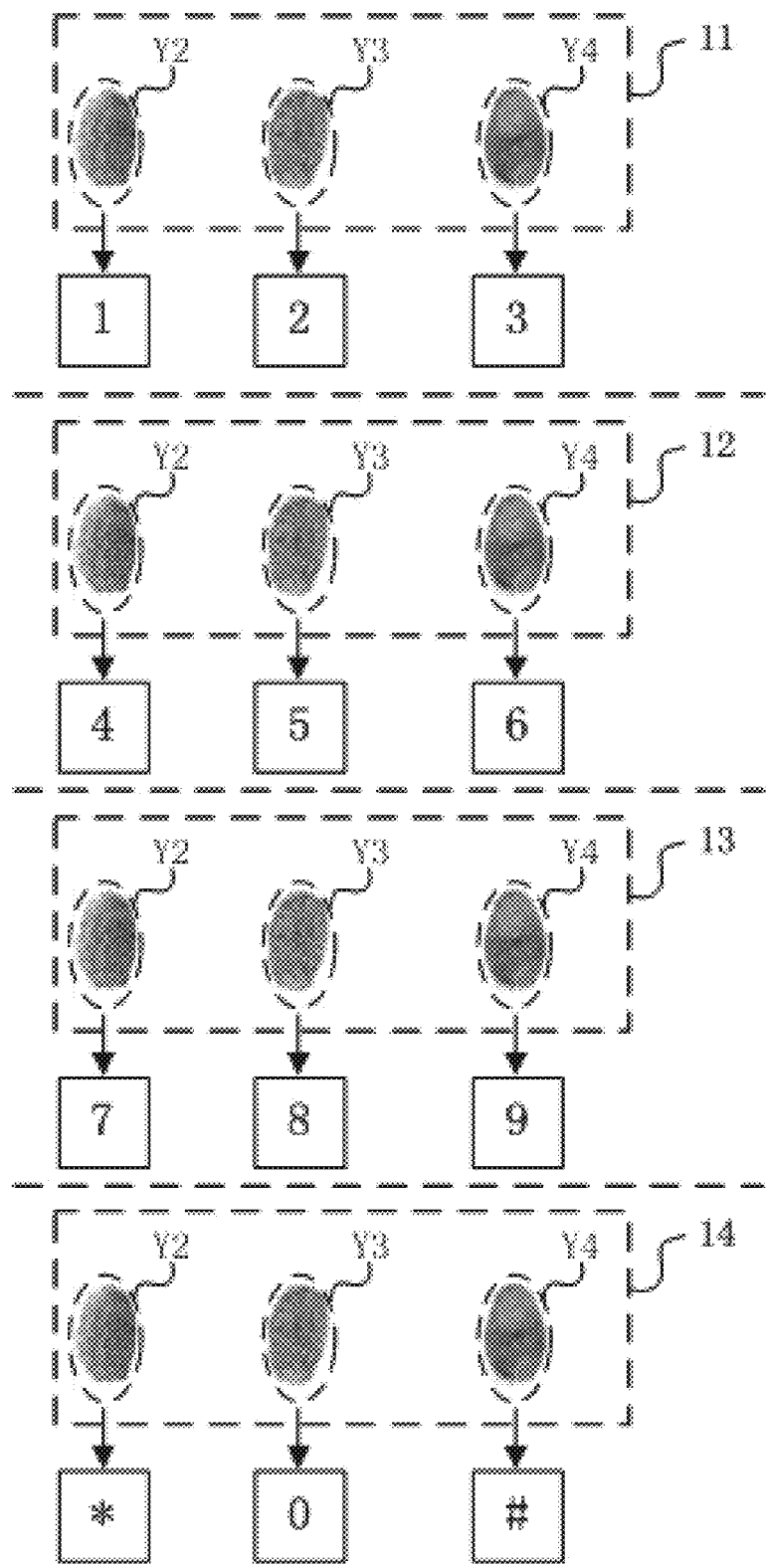
FIG. 5 shows a mapping relation of input information and fingerprints of the computer mouse of the first embodiment of the present disclosure.

FIG. 5 shows a mapping relation of input information and fingerprints of the computer mouse of the first embodiment of the present disclosure. As shown in FIG. 5, the output converting unit 15 pre-stores mapping relations of the first fingerprint contacting area 11, wherein the mapping relations include a mapping relation of an output single number "1" and the fingerprint pattern Y2 (the fingerprint of the index finger of the right hand), a mapping relation of an output single number "2" and the fingerprint pattern Y3 (the fingerprint of the middle finger of the right hand) and a mapping relation of an output single number "3" and the fingerprint Y4 (the fingerprint of the ring finger of the right hand).

When the user press the first contacting area 11 by the index finger of the right hand, the computer mouse recognizes the fingerprint of the index finger of the right hand and the single number "1" is outputted. When the user press the first contacting area 11 by the middle finger of the right hand, the computer mouse recognizes the fingerprint of the middle finger of the right hand and the single number "2" is outputted. When the user press the first contacting area 11 by the ring finger of the right hand, the computer mouse recognizes the fingerprint of the ring finger of the right hand and the single number "3" is outputted.

In the present disclosure, the output single number "1" is a number with a value 1. The quotation mark of the number "1" is used to identify literal meaning of 1, and the output information does not contain quotation marks.

Similarly, in the following description, the output letter "Y" refers to outputting the letter Y. The quotation mark of the letter "Y" is used to identify literal meaning of Y, and the output information does not contain quotation marks. The output symbol "*" refers to output a symbol *. The quotation mark of the symbol "*" is used to identify literal meaning of *, and the output information does not contain quotation marks.

The output converting unit 15 pre-stores mapping relations of the second fingerprint contacting area 12, wherein the mapping relations include a mapping relation of an output single number "4" and the fingerprint pattern Y2 (the fingerprint of the index finger of the right hand), a mapping relation of an output single number "5" and the fingerprint pattern Y3 (the fingerprint of the middle finger of the right hand) and a mapping relation of an output single number "6" and the fingerprint Y4 (the fingerprint of the ring finger of the right hand).

When the user press the second contacting area 12 by the index finger of the right hand, the computer mouse recognizes the fingerprint of the index finger of the right hand and the single number "4" is outputted. When the user press the second contacting area 12 by the middle finger of the right hand, the computer mouse recognizes the fingerprint of the middle finger of the right hand and the single number "5" is outputted. When the user press the second contacting area 12 by the ring finger of the right hand, the computer mouse recognizes the fingerprint of the ring finger of the right hand and the single number "6" is outputted.

The output converting unit 15 pre-stores mapping relations of the third fingerprint contacting area 13, wherein the mapping relations include a mapping relation of an output single number "7" and the fingerprint pattern Y2 (the fingerprint of the index finger of the right hand), a mapping relation of an output single number "8" and the fingerprint pattern Y3 (the fingerprint of the middle finger of the right hand) and a mapping relation of an output single number "9" and the fingerprint Y4 (the fingerprint of the ring finger of the right hand).

When the user press the third contacting area 13 by the index finger of the right hand, the computer mouse recognizes the fingerprint of the index finger of the right hand and the single number "7" is outputted. When the user press the third contacting area 13 by the middle finger of the right hand, the computer mouse recognizes the fingerprint of the middle finger of the right hand and the single number "8" is outputted. When the user press the third contacting area 13 by the ring finger of the right hand, the computer mouse recognizes the fingerprint of the ring finger of the right hand and the single number "9" is outputted.

The output converting unit 15 pre-stores mapping relations of the fourth fingerprint contacting area 14, wherein the mapping relations include a mapping relation of an output single number "*" and the fingerprint pattern Y2 (the fingerprint of the index finger of the right hand), a mapping relation of an output single number "0" and the fingerprint pattern Y3 (the fingerprint of the middle finger of the right hand) and a mapping relation of an output single number "#" and the fingerprint Y4 (the fingerprint of the ring finger of the right hand).

When the user press the fourth contacting area 14 by the index finger of the right hand, the computer mouse recognizes the fingerprint of the index finger of the right hand and the single number "*" is outputted. When the user press the third contacting area 13 by the middle finger of the right hand, the computer mouse recognizes the fingerprint of the middle finger of the right hand and the single number "0" is outputted. When the user press the third contacting area 13 by the ring finger of the right hand, the computer mouse recognizes the fingerprint of the ring finger of the right hand and the single number "#" is outputted.

The computer mouse, in this embodiment, is well compatible with the input information of the numeric keypad, and fully considering the conventional habits of the user and the human engineering. Moreover, the computer mouse is capable of providing functions of the commonly used input methods. The user is able to quickly get started. On the basis of the present disclosure, it is also within the scope of the present disclosure to increase or decrease the fingerprint contacting areas or to change the mapping relations between different fingerprint contacting areas and output characters.

In some embodiments, the computer mouse, in the present disclosure, further includes mechanical key buttons which is similar to the left key button and the right key button of the computer mouse. In some embodiments, the key buttons of the computer mouse includes a mechanical type, a touch control type or specific areas with fingerprint recognition type, which will not be described herein.

Figure 6:
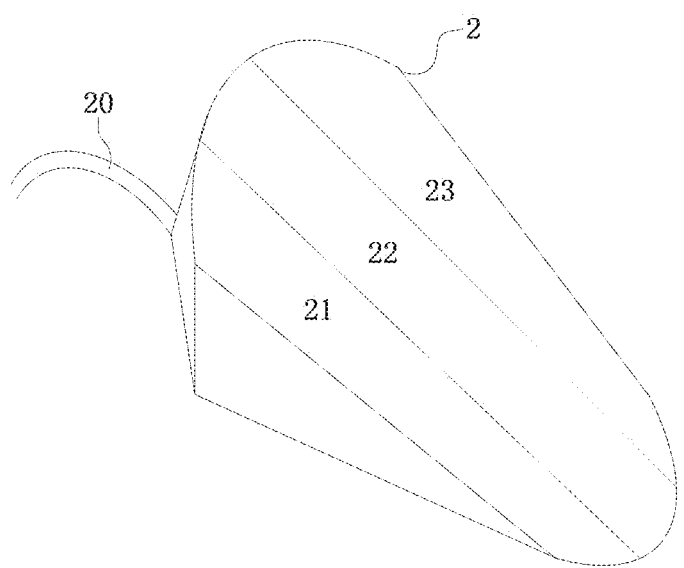
FIG. 6 shows a perspective view of a computer mouse of a second embodiment of the present disclosure.
Figure 7:
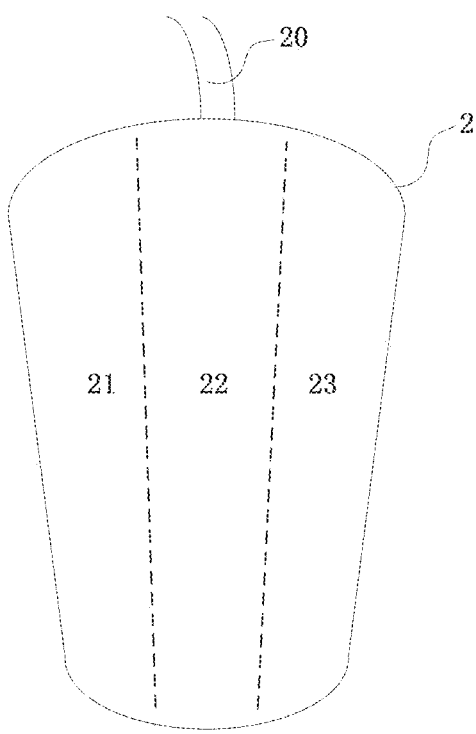
FIG. 7 shows a top view of the computer mouse of the second embodiment of the present disclosure.

FIG. 6 shows a perspective view of a computer mouse of a second embodiment of the present disclosure. FIG. 7 shows a top view of the computer mouse of the second embodiment of the present disclosure. As shown in FIGS. 6 and 7, in another embodiment, the computer mouse, in this embodiment, includes a wired computer mouse connected to other electronic devices through the cable wire 10. The computer mouse is configured to output the output character corresponding to the fingerprint pattern but is not limited thereto. The press-type fingerprint recognition device 2 of the computer mouse includes a plurality of fingerprint contacting areas (21, 22 and 23) arranged alone a direction in width of the computer mouse but is not limited thereto. In the present disclosure, the number of fingerprint contacting area arranged in the width direction is increased/decreased for the different number of output characters in response to actual needs.

Figure 8:
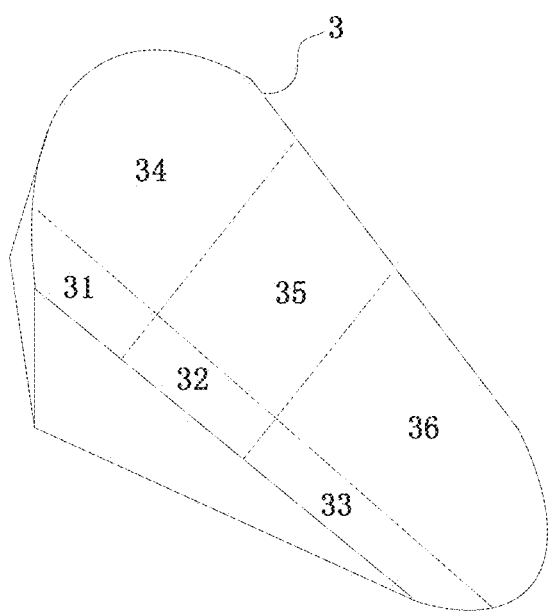
FIG. 8 shows a perspective view of a computer mouse of a third embodiment of the present disclosure.
Figure 9:
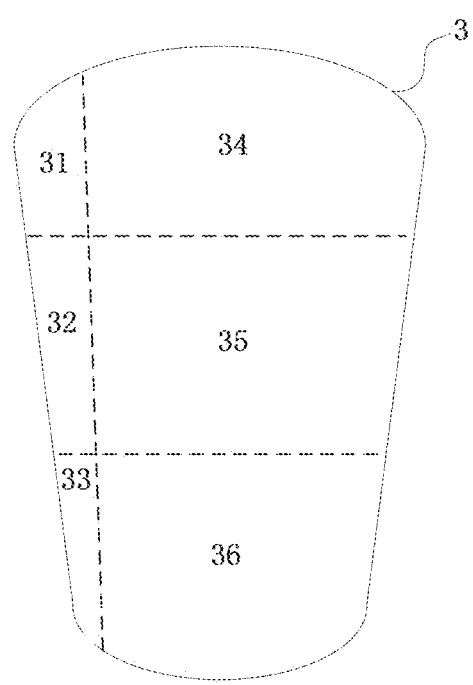
FIG. 9 shows a top view of the computer mouse of the third embodiment of the present disclosure.

FIG. 8 shows a perspective view of a computer mouse of a third embodiment of the present disclosure. FIG. 9 shows a top view of the computer mouse of the third embodiment of the present disclosure. In the present disclosure, the computer mouse is a wireless computer mouse, e.g. a Bluetooth computer mouse and a WIFI computer mouse. The fingerprint recognition devise 3 includes a plurality of fingerprint contacting areas grid-likely arranged on the upper surface of the computer mouse.

The fingerprint recognition device 3 includes six fingerprint contacting areas grid-likely arranged in three columns and two rows. The six fingerprint contacting areas include a first fingerprint contacting area 31 arranged in a first column and a first row, a second fingerprint contacting area 32 arranged in a second column and the first row, a third fingerprint contacting area 33 arranged in a third column and the first row, a fourth fingerprint contacting area 34 arranged in the first column and a second row, a fifth fingerprint contacting area 35 arranged in the second column, and the second row and a sixth fingerprint contacting area 36 arranged in the third column and the second row.

Furthermore, in order to adapt to the right hand operation, the width of the first fingerprint contacting area 31, the second fingerprint contacting area 32 and the third fingerprint contacting area 33 is narrower. The width of the fourth fingerprint contacting area 34, the fifth fingerprint contacting area 35 and the sixth fingerprint contacting area 36 is wider.

The mapping relations between the six fingerprint contact areas and the output characters are assigned according to the fingering of the right hand of the keyboard. Since the index finger of the human is the most flexible, which allows the index finger has the largest movable range when the computer mouse is held by the hand of the user. The index finger, in this embodiment, easily performs outputting of different information in response to the fingerprint contacting areas arranged in different rows of a column.

Figure 10:
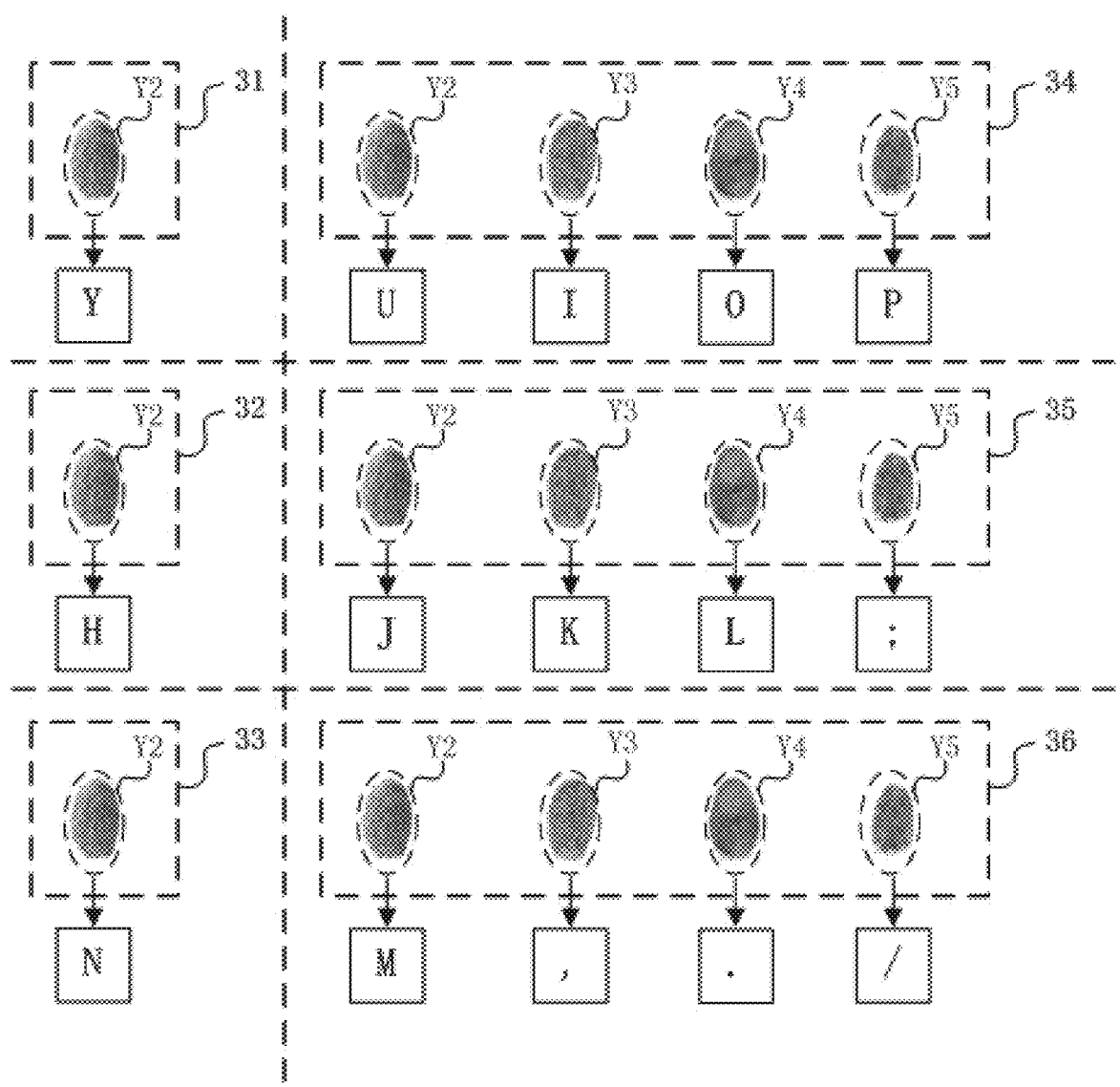
FIG. 10 shows a mapping relation of input information and fingerprints of the computer mouse of the third embodiment of the present disclosure.

FIG. 10 shows a mapping relation of input information and fingerprints of the computer mouse of the third embodiment of the present disclosure. As shown in FIG. 10, the output converting unit pre-stores a mapping relation of an output single letter "Y" and the fingerprint pattern Y2 (the fingerprint of the index finger of the right hand) of the first fingerprint contacting area 31. When the user presses the first fingerprint contacting area 31 by the index finger of the right hand, the fingerprint of the index finger of the right hand is recognized by the computer mouse and the single letter "Y" is then outputted.

The output converting unit pre-stores a mapping relation of an output single letter "H" and the fingerprint pattern Y2 (the fingerprint of the index finger of the right hand) of the second fingerprint contacting area 32. When the user presses the second fingerprint contacting area 32 by the index finger of the right hand, the fingerprint of the index finger of the right hand is recognized by the computer mouse and the single letter "H" is then outputted.

The output converting unit pre-stores a mapping relation of an output single letter "N" and the fingerprint pattern Y2 (the fingerprint of the index finger of the right hand) of the third fingerprint contacting area 33. When the user presses the third fingerprint contacting area 33 by the index finger of the right hand, the fingerprint of the index finger of the right hand is recognized by the computer mouse and the single letter "N" is then outputted.

The output converting unit pre-stores a mapping relation of an output single letter "U" and the fingerprint pattern Y2 (the fingerprint of the index finger of the right hand) of the fourth fingerprint contacting area 34, a mapping relation of an output single letter "I" and the fingerprint pattern Y3 (the fingerprint of the middle finger of the right hand) of the fourth fingerprint contacting area 34, a mapping relation of an output single letter "O" and the fingerprint pattern Y4 (the fingerprint of the ring finger of the right hand) of the fourth fingerprint contacting area 34, and a mapping relation of an output single letter "P" and the fingerprint pattern Y5 (the fingerprint of the little finger of the right hand) of the fourth fingerprint contacting area 34.

When the user presses the fourth fingerprint contacting area 34 by the index finger of the right hand, the fingerprint of the index finger of the right hand is recognized by the computer mouse and the single letter "U" is then outputted. When the user presses the fourth fingerprint contacting area 34 by the middle finger of the right hand, the fingerprint of the middle finger of the right hand is recognized by the computer mouse and the single letter "I" is then outputted. When the user presses the fourth fingerprint contacting area 34 by the ring finger of the right hand, the fingerprint of the ring finger of the right hand is recognized by the computer mouse and the single letter "O" is then outputted. When the user presses the fourth fingerprint contacting area 34 by the little finger of the right hand, the fingerprint of the little finger of the right hand is recognized by the computer mouse and the single letter "P" is then outputted.

The output converting unit pre-stores a mapping relation of an output single letter "J" and the fingerprint pattern Y2

(the fingerprint of the index finger of the right hand) of the fifth fingerprint contacting area 35, a mapping relation of an output single letter "K" and the fingerprint pattern Y3 (the fingerprint of the middle finger of the right hand) of the fifth fingerprint contacting area 35, a mapping relation of an output single letter "L" and the fingerprint pattern Y4 (the fingerprint of the ring finger of the right hand) of the fifth contacting area 35, and a mapping relation of an output single letter ";" and the fingerprint pattern Y5 (the fingerprint of the little finger of the right hand) of the fifth fingerprint contacting area 35.

When the user presses the fifth fingerprint contacting area 35 by the index finger of the right hand, the fingerprint of the index finger of the right hand is recognized by the computer mouse and the single letter "J" is then outputted. When the user presses the fifth fingerprint contacting area 35 by the middle finger of the right hand, the fingerprint of the middle finger of the right hand is recognized by the computer mouse and the single letter "K" is then outputted. When the user presses the fifth fingerprint contacting area 35 by the ring finger of the right hand, the fingerprint of the ring finger of the right hand is recognized by the computer mouse and the single letter "L" is then outputted. When the user presses the fifth fingerprint contacting area 35 by the little finger of the right hand, the fingerprint of the little finger of the right hand is recognized by the computer mouse and the single letter ";" is then outputted.

The output converting unit pre-stores a mapping relation of an output single letter "M" and the fingerprint pattern Y2 (the fingerprint of the index finger of the right hand) of the sixth fingerprint contacting area 36, a mapping relation of an output single letter "," and the fingerprint pattern Y3 (the fingerprint of the middle finger of the right hand) of the sixth fingerprint contacting area 36, a mapping relation of an output single letter "." and the fingerprint pattern Y4 (the fingerprint of the ring finger of the right hand) of the sixth contacting area 36, and a mapping relation of an output single letter "/" and the fingerprint pattern Y5 (the fingerprint of the little finger of the right hand) of the sixth fingerprint contacting area 36.

When the user presses the sixth fingerprint contacting area 36 by the index finger of the right hand, the fingerprint of the index finger of the right hand is recognized by the computer mouse and the single letter "M" is then outputted. When the user presses the sixth fingerprint contacting area 36 by the middle finger of the right hand, the fingerprint of the middle finger of the right hand is recognized by the computer mouse and the single letter "," is then outputted. When the user presses the sixth fingerprint contacting area 36 by the ring finger of the right hand, the fingerprint of the ring finger of the right hand is recognized by the computer mouse and the single letter "." is then outputted. When the user presses the sixth fingerprint contacting area 36 by the little finger of the right hand, the fingerprint of the little finger of the right hand is recognized by the computer mouse and the single letter "/" is then outputted.

The computer mouse, in this embodiment, is well compatible with the input information of the numeric keypad, and fully considering the conventional habits of the user and the human engineering. Moreover, the computer mouse is capable of providing functions of the commonly used input methods. The user is able to quickly get started. On the basis of the present disclosure, it is also within the scope of the present disclosure to increase or decrease the fingerprint contacting areas or to change the mapping relations between different fingerprint contacting areas and output characters.

In some embodiments of the present disclosure, the configurations of the fingerprint contacting areas of the first fingerprint recognition device of the computer mouse are not un-switchable. A configuration of the fingerprint contacting areas is able to be switched to another configuration of the fingerprint contacting areas by a switch. Moreover, more configurations of the fingerprint contacting areas are switchable each other by switches and more output characters, e.g. characters of 87-key keyboard and characters of 101-key keyboard, are outputted by movements, made by the finger, on the limited surface of the computer mouse.

Figure 11:
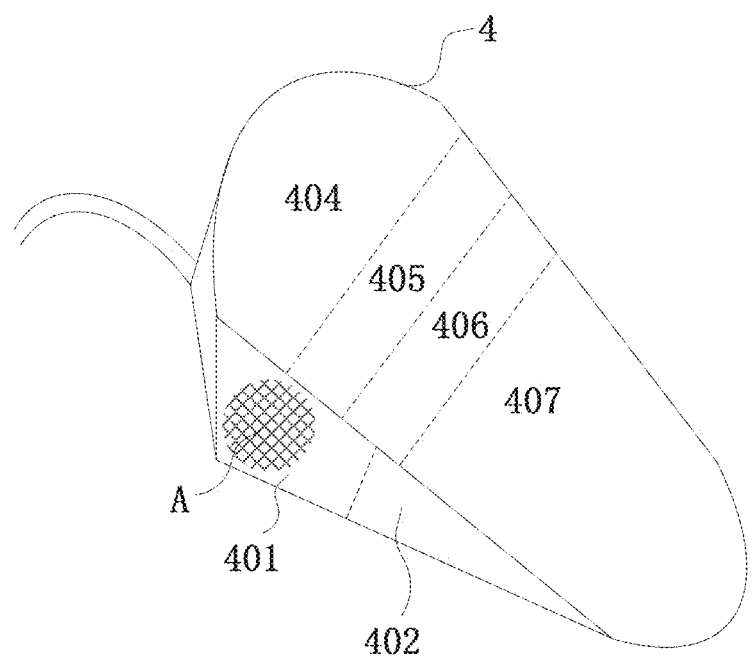
FIG. 11 shows a schematic view of configurations of a first fingerprint contacting area of a computer mouse of a fourth embodiment of the present disclosure.
Figure 12:
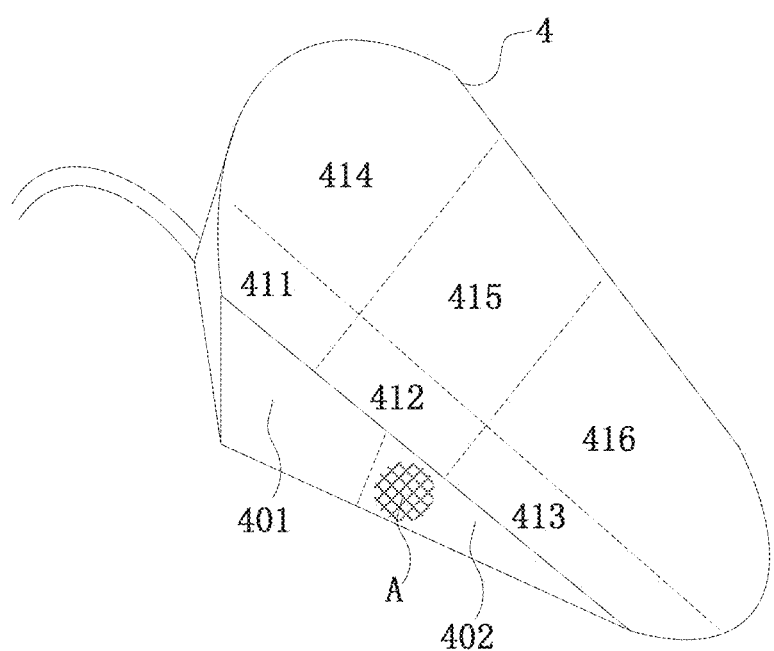
FIG. 12 shows a schematic view of configurations of a second fingerprint contacting area of the computer mouse of the fourth embodiment of the present disclosure.

FIG. 11 shows a schematic view of configurations of a first fingerprint contacting area of a computer mouse of a fourth embodiment of the present disclosure. FIG. 12 shows a schematic view of configurations of a second fingerprint contacting area of the computer mouse of the fourth embodiment of the present disclosure. As shown in FIGS. 11 and 12, in the present disclosure, the computer mouse includes the previously described first fingerprint recognition device and a second fingerprint recognition device used as a switch. The second fingerprint recognition device is preferably disposed on a side of the computer device. The second fingerprint recognition device disposed on the side is more convenient for the operation of the thumb, but is not limited thereto.

In some embodiments, both of the first fingerprint recognition device and the second fingerprint recognition device are disposed on an upper surface of the computer mouse. The second fingerprint recognition device is connected to the output converting unit. The first fingerprint recognition device switches, in response to the control information of the second fingerprint recognition device, between the configurations of the different fingerprint contacting areas. The configurations of the fingerprint contacting areas include combinations of the fingerprint areas arranged in columns and rows. In different configurations, the output converting unit pre-stores a mapping relation of a plurality of fingerprint data and a plurality of output characters. The configurations of the fingerprint contacting areas includes at least one combination of a combination including the fingerprint contacting areas arranged alone a direction in length of the computer mouse, a combination including the fingerprint contacting areas arranged alone a direction in width of the computer mouse, a combination including six fingerprint areas grid-likely arranged in three columns and two rows, a combination including eight fingerprint areas grid-likely arranged in four columns and two rows, and a combination including twelve fingerprint areas grid-likely arranged in four columns and three rows but is not limited thereto.

In this embodiment, the switch includes the second fingerprint recognition device having two fingerprint contacting areas. The output converting unit pre-stores a mapping relation of a fingerprint pattern Y1 (a fingerprint of the thumb of the right hand) of the first fingerprint contacting area 401 of the second fingerprint recognition device and a configuration of the first fingerprint contacting area of the first fingerprint recognition device 4 of FIG. 11. The output converting unit pre-stores a mapping relation of a fingerprint pattern Y1 (a fingerprint of the thumb of the right hand) of the second fingerprint contacting area 402 and a configuration of the second fingerprint contacting area of the first fingerprint recognition device 4 of FIG. 12, but is not limited thereto.

In some embodiments, the toggle switch, in the present disclosure, includes physical buttons or a switch, which will not be described herein. The configuration of the first fingerprint contacting areas includes the first fingerprint contacting area 404, the second fingerprint contacting area 405, the third fingerprint contacting area 406, and the fourth fingerprint contacting area 407, which are arranged, as shown in FIG. 11, alone a direction in length of the computer mouse. The configuration of the second fingerprint contacting areas, six fingerprint contacting areas, includes the first fingerprint contacting area 411, the second fingerprint contacting area 412, the third fingerprint contacting area 413, and the fourth fingerprint contacting area 414, the fifth fingerprint contacting area 415 and the sixth fingerprint contacting area 416, which are grid-likely arranged, as shown in FIG. 12, in three columns and two rows.

When the first fingerprint contacting area 401 of the second fingerprint recognition device is pressed, the first fingerprint recognition device 4 of the computer mouse is switched to the configuration of the first fingerprint contacting area. When the second fingerprint contacting area 402 of the second fingerprint recognition device is pressed, the first fingerprint recognition device 4 of the computer mouse is switched to the configuration of the second fingerprint contacting area. Therefore, more numbers of the output characters are configured on the limited surface of the computer mouse by assistances of the switch. The combination of the multiple toggle switches and the first fingerprint recognition device perform outputting of English letter output characters and all numerical output characters.

Figure 13:
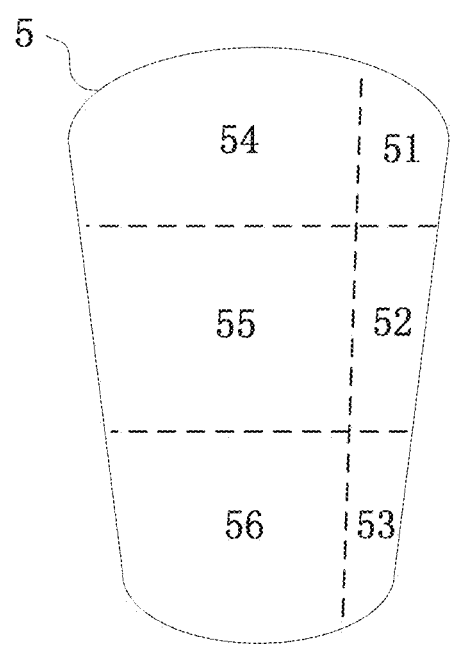
FIG. 13 shows a top view of a computer mouse of a fifth embodiment of the present disclosure.

In some embodiments, the output character of the computer mouse, in the present disclosure, is belong to characters of right hand input of keyboard fingering, which is adapt to a user using the computer mouse with the right hand, but is not limited therein. In some embodiments, the output character of the computer mouse, in the present disclosure, is belong to characters of left hand input of keyboard fingering, which is adapt to a user using the computer mouse with the left hand, but is not limited therein. FIG. 13 shows a top view of a computer mouse of a fifth embodiment of the present disclosure. As shown in FIG. 13, in this embodiment, the configuration of the fingerprint contacting areas of the computer mouse 5 is arranged in response to the habits of use of the left hand of the user. The configuration of the fingerprint contacting areas of the computer mouse 5, as shown in FIG. 12, includes six fingerprint contacting areas (a first fingerprint contacting area 51, a second fingerprint contacting area 52, a third fingerprint contacting area 53, a fourth fingerprint contacting area 54, a fifth fingerprint contacting area 55 and a sixth fingerprint contacting area 56) grid-likely arranged in three columns and two rows. In order to adapt to the left hand operation, the width of the first fingerprint contacting area 51, the second fingerprint contacting area 52 and the third fingerprint contacting area 53, disposed on the right side, is narrower. Moreover, the width of the fourth fingerprint contacting area 54, the fifth fingerprint contacting area 55 and the sixth fingerprint contacting area 56, disposed on the left side, is wider. The mapping relation of the six fingerprint contacting areas and the output characters is assigned in response to the fingering of the left hand keyboard.

Figure 14:
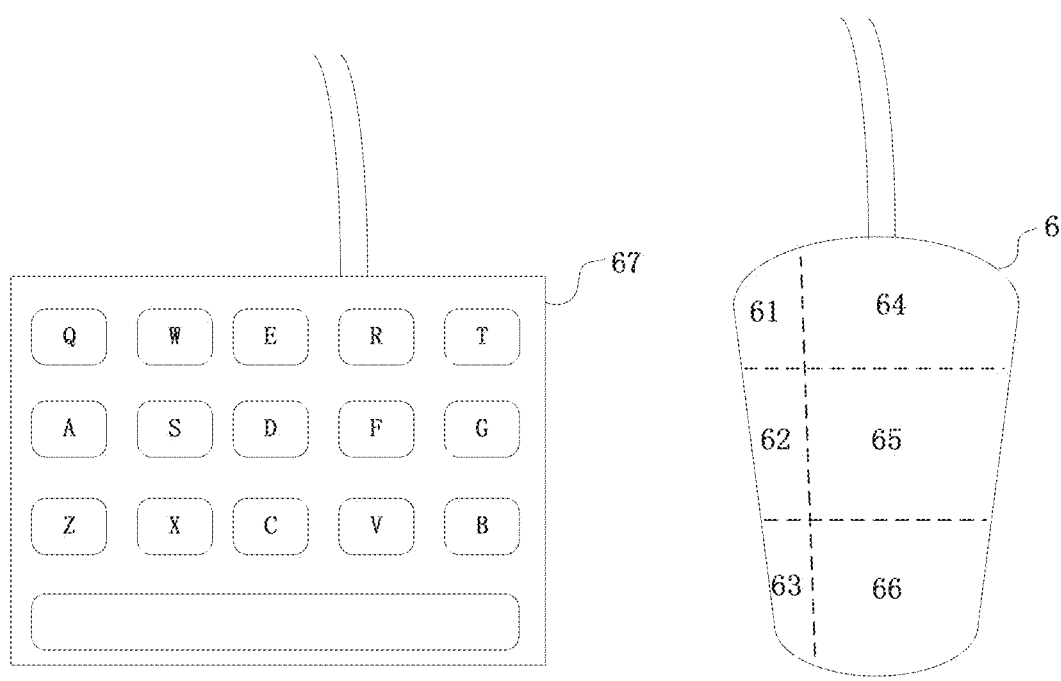
FIG. 14 shows a top view of an input suite of a first embodiment of the present disclosure.
Figure 15:
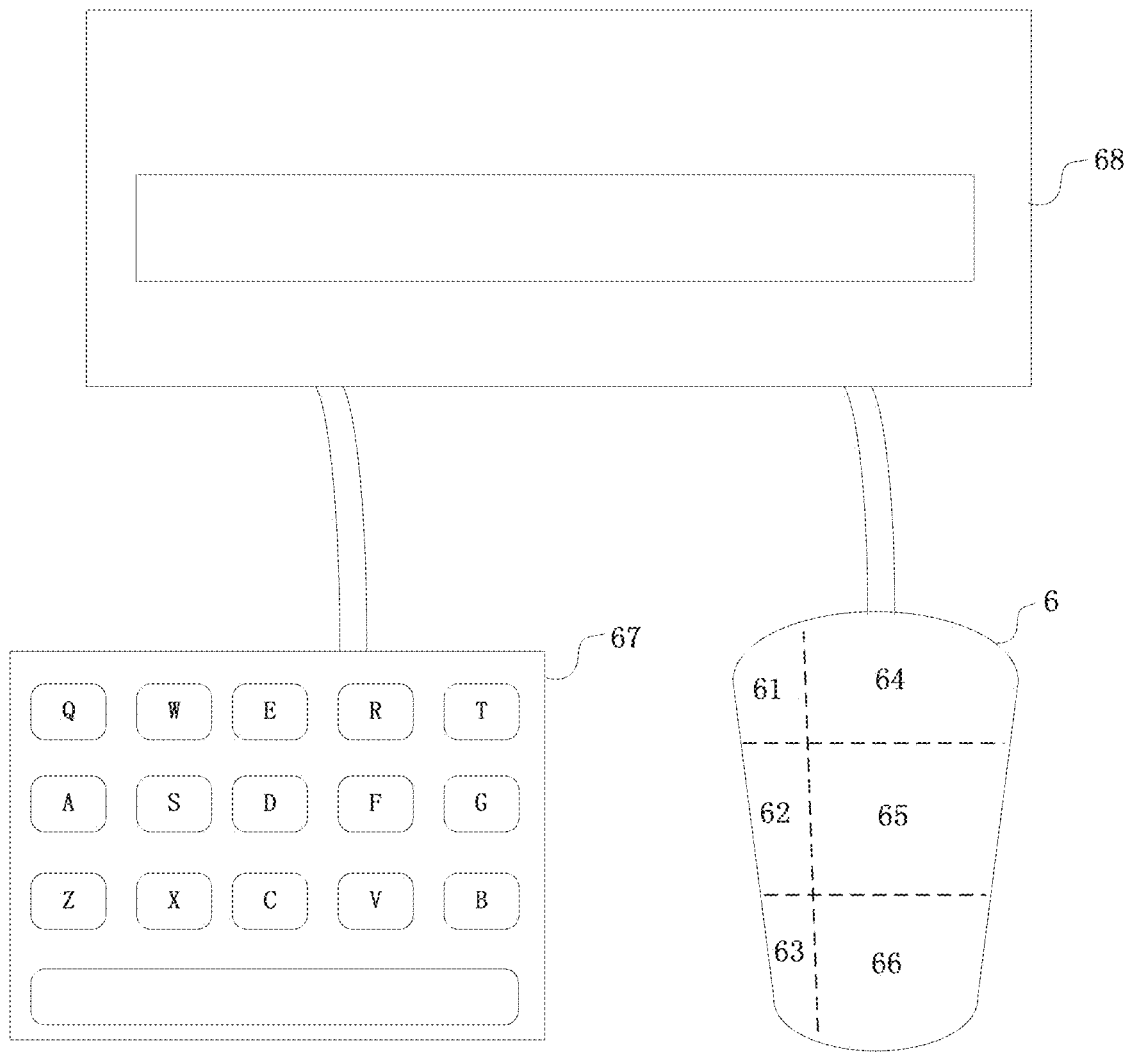
FIG. 15 shows a schematic view of the input suite of the first embodiment of the present disclosure connected to a computer.

FIG. 14 shows a top view of an input suite of a first embodiment of the present disclosure. FIG. 15 shows a schematic view of the input suite of the first embodiment of the present disclosure connected to a computer. As shown in FIGS. 14 and 15, in the present disclosure, the first input suite includes a keyboard 67 and a computer mouse 6. The computer mouse 6 includes six fingerprint contacting areas (the first fingerprint contacting area 61, the second fingerprint contacting area 62, the third fingerprint contacting area 63, the fourth fingerprint contacting area 64, the fifth fingerprint contacting area 65 and the sixth fingerprint contacting area 66). The different characters are outputted, by the computer mouse 6, in response to the different fingerprints received by the six fingerprint contacting areas. In some embodiments, English letters and all numerical characters, corresponding to the right hand fingering of the keyboard, are outputted by the computer mouse 6 having a toggle switch, which will not be described herein. Moreover, a portion of the English letters is outputted by the keyboard 67 and the remaining portion of the English letters is outputted by the computer mouse 6. The keyboard 67 and the computer mouse 6 are connected to a computer 68 as input devices of the computer 68. Preferably, the English letters corresponding to the left hand fingering of the keyboard are outputted by the keyboard 67 and the English letters corresponding to the right hand fingering of the keyboard are outputted by the computer mouse 6. Therefore, when the keyboard 67 is used with the computer mouse 6, it is possible to output all the English letters. The related technical features of the present disclosure are described as above, and will not be repeatedly described herein.

Figure 16:
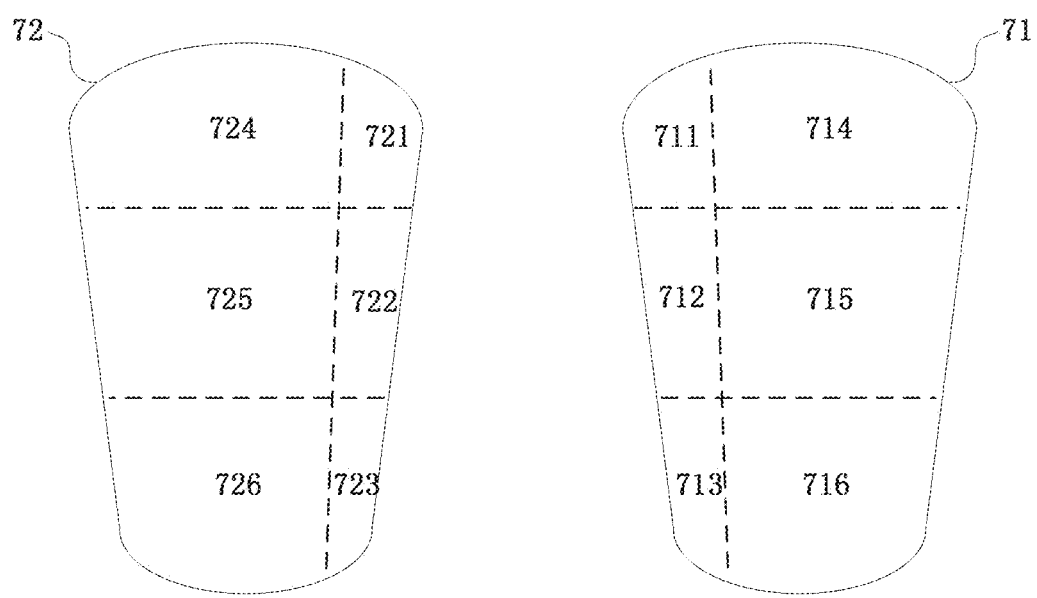
FIG. 16 shows a top view of an input suite of a second embodiment of the present disclosure.

FIG. 16 shows a top view of an input suite of a second embodiment of the present disclosure. As shown in FIG. 16, the input suite of a second embodiment of the present disclosure includes a computer mouse 71 and a computer mouse 72. The computer mouse 71 includes six fingerprint contacting areas (a first fingerprint contacting area 711, a second fingerprint contacting area 712, a third fingerprint contacting area 713, a fourth fingerprint contacting area 714, a fifth fingerprint contacting area 715 and a sixth fingerprint contacting area 716). With the different fingerprints received by the six fingerprint contacting areas, the English letters corresponding to the right hand fingering of the keyboard are outputted by the computer mouse 71. In some embodiments, the English letters and all numerical characters, corresponding to the right hand fingering of the keyboard, are outputted by the computer mouse 71 having a toggle switch and will not be repeatedly described herein.

The computer mouse 72 includes six fingerprint contacting areas (a first fingerprint contacting area 721, a second fingerprint contacting area 722, a third fingerprint contacting area 723, a fourth fingerprint contacting area 724, a fifth fingerprint contacting area 725 and a sixth fingerprint contacting area 726). With the different fingerprints received by the six fingerprint contacting areas, the English letters corresponding to the left hand fingering of the keyboard are outputted by the computer mouse 72. Therefore, English letters are outputted in combination with the computer mouse 71 and the computer mouse 72. Moreover, since the computer mouse functions of the two computer mice are not performed at the same time, the computer mouse 71 of the second input suite of the present disclosure is configured to be a primary computer mouse. The computer mouse 71 provides a movement track of the cursor and partial keyboard functions, while the computer mouse 72 only provides partial keyboard functions and does not record the movement track of the cursor.

Figure 17:
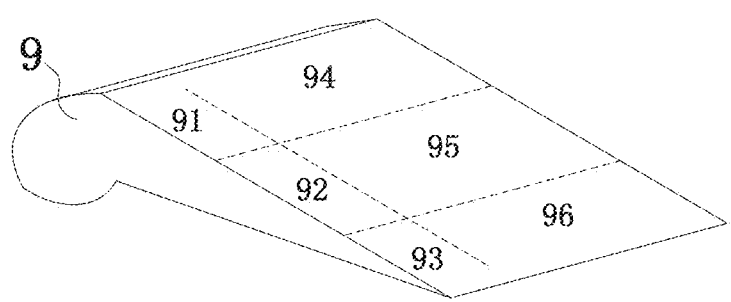
FIG. 17 shows a perspective view of a touchpad of a first embodiment of the present disclosure.

FIG. 17 shows a perspective view of a touchpad of a first embodiment of the present disclosure. As shown in FIG. 17, a touchpad 9 of the present disclosure includes at least one touch-detection and fingerprint-recognition device and an output converting unit. The touch-detection and fingerprint-recognition device is disposed on an outer surface of the touchpad. The touch-detection and fingerprint-recognition device adopts the way of capacitive touch control recognition to recognize fingerprint data and detect touch motion information. The touch motion information is used as a moving track of the cursor. The user is able to perform click, slide, and other conventional computer mouse actions, even multi-touch gestures on the surface of the touch detection and the fingerprint recognition device. Moreover, the output converting unit is connected to the first fingerprint recognition device.

The output converting unit pre-stores a mapping relation of a plurality of fingerprint data and a plurality of output characters. The output converting unit outputs an output character in response to the received fingerprint data. In a preferred embodiment, the touch detection and fingerprint recognition device of the touchpad 9, in this embodiment, includes a plurality of fingerprint contacting areas which are grid-likely arranged on an upper surface of the computer mouse. The touch detection and fingerprint recognition device includes six fingerprint contacting areas grid-likely arranged in three columns and two rows. The fingerprint contacting areas include a first fingerprint contacting area 91 arranged in a first column and a first row, a second fingerprint contacting area 92 arranged in a second column and the first row, a third fingerprint contacting area 93 arranged in a third column and the first row, a fourth fingerprint contacting area 94 arranged in the first column and a second row, a fifth fingerprint contacting area 95 arranged in the second column and the second row and a sixth fingerprint contacting area 96 arranged in the third column and the second row.

Furthermore, in order to adapt to the right hand operation, the width of the first fingerprint contacting area 91, the second fingerprint contacting area 92 and the third fingerprint contacting area 93 is narrower. The width of the fourth fingerprint contacting area 94, the fifth fingerprint contacting area 95 and the sixth fingerprint contacting area 96 is wider. The mapping relations between the six fingerprint contact areas and the output characters are assigned according to the right hand fingering of the keyboard. Since the index finger of the human is the most flexible, which allows the index finger has the largest movable range when the computer mouse is held by the hand of the user. In some embodiments, the touchpad 9, having a toggle switch, is able to output the English letter corresponding to the right hand fingering of the keyboard and all numerical characters, which will not be repeatedly described therein. In some embodiments, the touchpad 9 is a digital painting board, which will not be repeatedly described therein.

Figure 18:
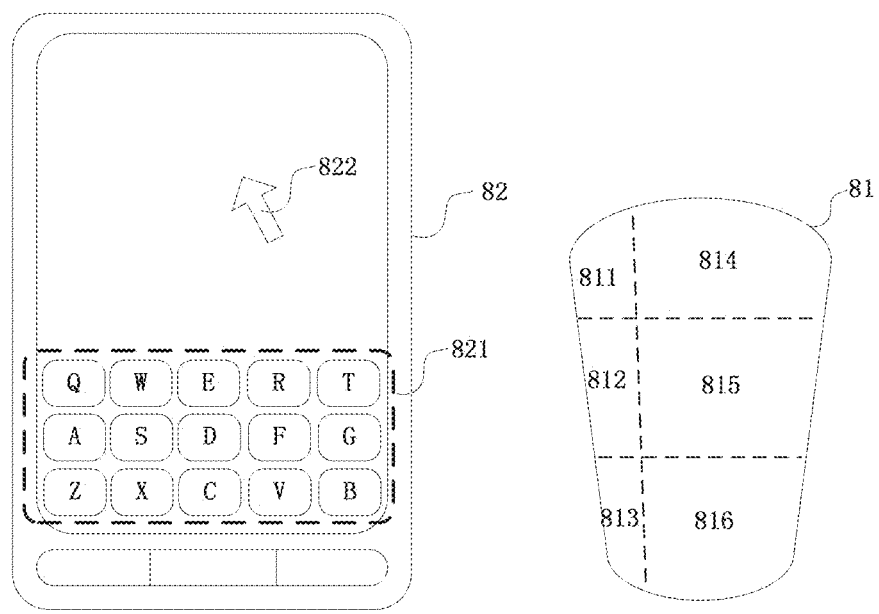
FIG. 18 shows a schematic view of an input suite of a third embodiment of the present disclosure.

FIG. 18 shows a schematic view of an input suite of a third embodiment of the present disclosure. As shown in FIG. 18, the third input suite of the present disclosure includes a keyboard 97 and the touchpad 9 of FIG. 17. In this embodiment, a portion of the English letters is outputted by the keyboard 97 and the remaining portion of the English letters and/or all numerical characters are outputted by the touchpad 9 in response to the received fingerprint. The keyboard 97 and the touchpad 9 are connected to a computer 98 as input devices of the computer 98. Preferably, the English letters corresponding to the left hand fingering of the keyboard are outputted by the keyboard 97 and the English letters corresponding to the right hand fingering of the keyboard are outputted by the touchpad 9. Therefore, when the keyboard 97 is used with the touchpad 9, it is possible to output all the English letters. The related technical features of the present disclosure are described as above, and will not be repeatedly described herein.

Figure 19:
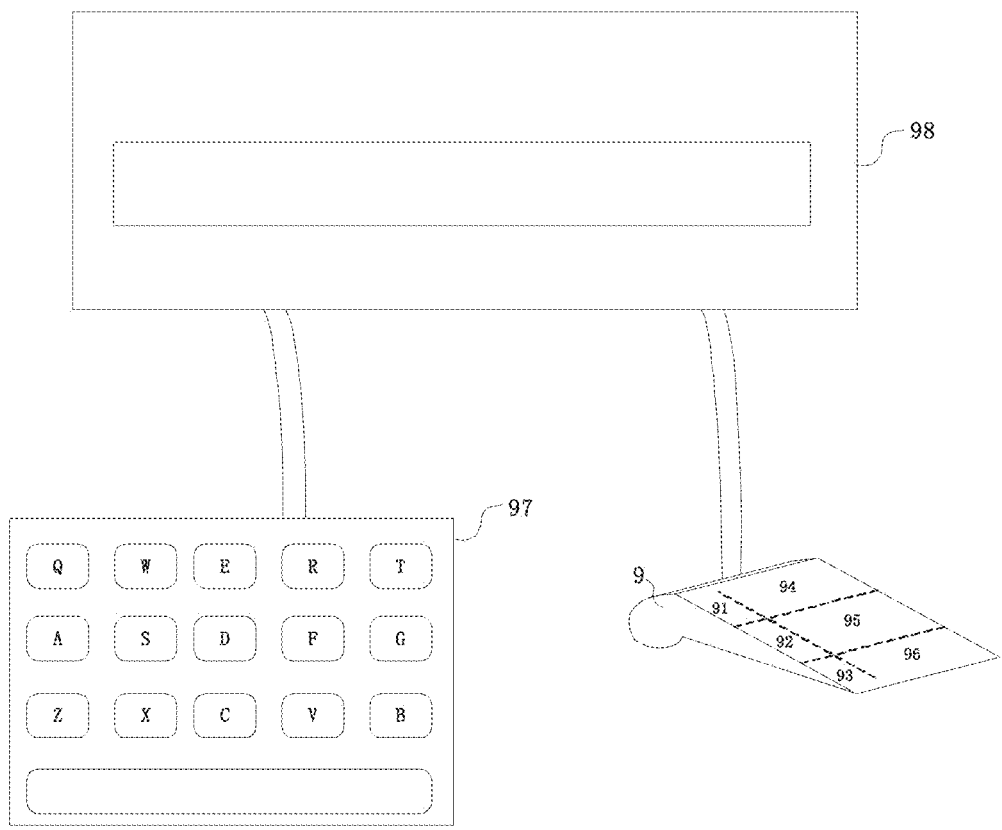
FIG. 19 shows a top view of a mobile device of a first embodiment of the present disclosure.

FIG. 19 shows a top view of a mobile device of a first embodiment of the present disclosure. As shown in FIG. 19, a mobile device of the present disclosure includes a mobile terminal 82 and the computer mouse 81. A portion of the English characters is outputted by a virtual keyboard 821 of the mobile terminal 82. The remaining portion of the English letters and/or all numerical characters is outputted by the computer mouse. The computer mouse 81 includes six fingerprint contacting areas (a first fingerprint contacting area 821 arranged in a first column and a first row, a second fingerprint contacting area 822 arranged in a second column and the first row, a third fingerprint contacting area 823 arranged in a third column and the first row, a fourth fingerprint contacting area 824 arranged in the first column and a second row, a fifth fingerprint contacting area 825 arranged in the second column and the second row and a sixth fingerprint contacting area 826).

Therefore, when the virtual keyboard 821 is used with the computer mouse 81, it is possible to Output all the English letters. Moreover, the computer mouse 81 provides a movement track of the cursor 822 to the mobile terminal 82. The related technical features of the present disclosure are described as above, and will not be repeatedly described herein.

In summary, the computer mouse, the touchpad, the input suite, and the mobile device of the present disclosure are capable of outputting characters by implementing fingerprint recognition. The computer mouse and the touchpad have both functions of the keyboard, decreasing the time of familiarizing with the keyboard. There is no wrong input caused by the incorrectly touch position when pressing the fingerprint contacting areas. The correspondence of the fingerprint and the code is customized. Moreover, the fingerprints received by the fingerprint contacting areas are encrypted and the common input method is naturally defined to facilitate the user to quickly get started.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The above is a detailed description of the present disclosure in connection with the specific preferred embodiments, and the specific embodiments of the present disclosure are not limited to the description. It will be apparent to those skilled in the art that the present disclosure is made without departing from the spirit and scope of the present disclosure.

What is claimed is:

1. A computer mouse, comprising:
   at least one first fingerprint recognition device disposed on an outside surface of the computer mouse, and configured to recognize fingerprint data; and
   an output converting unit connected to the first fingerprint recognition device, wherein a mapping relation of a plurality of fingerprint data and a plurality of output characters is pre-stored in the output converting unit, and one of the output characters is outputted, by the output converting unit, in response to a received fingerprint data coming from the first fingerprint recognition device.

2. The computer mouse according to claim 1, wherein the first fingerprint recognition device is located on an upper surface of the computer mouse, and the fingerprint recognition device comprises a plurality of fingerprint contacting areas; and
   wherein the mapping relation of the output characters and the fingerprint data, identified by each of the fingerprint contacting areas, is pre-stored in the output converting unit, and each of the fingerprint data, identified by each of the contacting areas, is corresponding to one of the output characters.

3. The computer mouse according to claim 2, wherein the fingerprint recognition devise comprises a plurality of fingerprint contacting areas arranged along a direction in length of the computer mouse.

4. The computer mouse according to claim 3, wherein the fingerprint recognition device comprises four fingerprint contacting areas;
wherein the fingerprint recognition device respectively comprises a first fingerprint contacting area, a second fingerprint contacting area, a third fingerprint contacting area and a fourth fingerprint contacting area; and
wherein the output converting unit pre-stores:
a mapping relation of a single output character "1" and a first fingerprint of the first fingerprint contacting area, a mapping relation of a single output character "2" and a second fingerprint of the first fingerprint contacting area, and a mapping relation of a single output character "3" and a third fingerprint of the first fingerprint contacting area;
a mapping relation of a single output character "4" and a first fingerprint of the second fingerprint contacting area, a mapping relation of a single output character "5" and a second fingerprint of the second fingerprint contacting area, and a mapping relation of a single output character "6" and a third fingerprint of the second fingerprint contacting area;
a mapping relation of a single output character "7" and a first fingerprint of the third fingerprint contacting area, a mapping relation of a single output character "8" and a second fingerprint of the third fingerprint contacting area, and a mapping relation of a single output character "9" and a third fingerprint of the third fingerprint contacting area; and
a mapping relation of a single output character "*" and a first fingerprint of the fourth fingerprint contacting area, a mapping relation of a single output character "0" and a second fingerprint of the fourth fingerprint contacting area, and a mapping relation of a single output character "#" and a third fingerprint of the fourth fingerprint contacting area.

5. The computer mouse according to claim 2, wherein the fingerprint recognition devise comprises a plurality of fingerprint contacting areas arranged along a direction in width of the computer mouse.

6. The computer mouse according to claim 2, wherein the fingerprint recognition devise comprises a plurality of fingerprint contacting areas grid-likely arranged on the upper surface of the computer mouse.

7. The computer mouse according to claim 6, wherein the fingerprint recognition device comprises six fingerprint contacting areas grid-likely arranged in three columns and two rows, wherein the fingerprint contacting areas comprises a first fingerprint contacting area arranged in a first column and a first row, a second fingerprint contacting area arranged in a second column and the first row, a third fingerprint contacting area arranged in a third column and the first row, a fourth fingerprint contacting area arranged in the first column and a second row, a fifth fingerprint contacting area arranged in the second column and the second row and a sixth fingerprint contacting area arranged in the third column and the second row; and
wherein the output converting unit pre-stores:
a mapping relation of a first fingerprint and the output characters of each of the fingerprint contacting areas, from the first fingerprint contacting area to the sixth fingerprint contacting area, and a mapping relation of a second fingerprint and the output characters, a mapping relation of a third fingerprint and the output characters, and a mapping relation of a fourth fingerprint and the output characters, of each of the fingerprint contacting areas, from the fourth fingerprint contacting area to the sixth fingerprint contacting area.

8. The computer mouse according to claim 7, wherein the output converting unit pre-stores:
a mapping relation of a single output character "Y" and a first fingerprint of the first fingerprint contacting area;
a mapping relation of a single output character "H" and a first fingerprint of the second fingerprint contacting area;
a mapping relation of a single output character "N" and a first fingerprint of the third fingerprint contacting area;
a mapping relation of a single output character "U" and the first fingerprints;
a mapping relation of a single output character "I" and the second fingerprint;
a mapping relation of a single output character "O" and the third fingerprint, a mapping relation of a single output character "P" and the fourth fingerprint, of the fourth fingerprint contacting area;
a mapping relation of a single output character "J" and the first fingerprint, a mapping relation of a single output character "K" and the second fingerprint;
a mapping relation of a single output character "L" and the third fingerprint;
a mapping relation of a single output character ";" and the fourth fingerprint, of the fifth fingerprint contacting area;
a mapping relation of a single output character "M" and the first fingerprint;
a mapping relation of a single output character "," and the second fingerprint;
a mapping relation of a single output character "." and the third fingerprint; and
a mapping relation of a single output character "I" and the fourth fingerprint, of the fifth fingerprint contacting area.

9. The computer mouse according to claim 1, wherein the output characters are key characters input by a right hand in keyboard fingering or the output characters are key characters input by a left hand in the keyboard fingering.

10. The computer mouse according to claim 2 further comprising a switch connected to the output converting unit and the first fingerprint recognition device, switched between configurations of different fingerprint contacting areas in response to control signals of the switch, wherein each of the configurations of the fingerprint contacting areas comprises a combination of at least one column and at least one row of the fingerprint contacting areas, and the mapping relation of the output characters and the fingerprint data of the first fingerprint recognition device in different configurations.

11. The computer mouse according to claim 10, wherein the switch is a second fingerprint recognition device with fingerprint contacting areas, and the output converting unit pre-stores a mapping relation of a configuration of the fingerprint contacting areas and at least one of the fingerprint data of each of the fingerprint contacting areas of the second fingerprint recognition device.

12. The computer mouse according to claim 11, wherein, the configuration of the fingerprint contacting areas comprises at least one of following combinations of the fingerprint contacting areas:
- a combination of the fingerprint contacting areas arranged along a direction in length of the computer mouse;
- a combination of the fingerprint contacting areas arranged along a direction in width of the computer mouse;
- a combination of the six fingerprint contacting areas grid-likely arranged in three columns and two rows;
- a combination of the eight fingerprint contacting areas grid-likely arranged in four columns and two rows; and
- a combination of the twelve fingerprint contacting areas grid-likely arranged in four columns and three rows.

13. The computer mouse according to claim 1, wherein the output character comprises at least one of letters, numbers, symbols, emoji, and formulas.

14. A touchpad, comprising:
- at least one touch-detection and fingerprint-recognition device disposed on an outer surface of the touchpad, wherein the touch-detection and fingerprint-recognition device is configured to recognize fingerprint data and detect touch motion information, wherein the touch motion information is used as a moving track of the cursor; and
- an output converting unit connected to a first fingerprint recognition device of the touch-detection and fingerprint-recognition device, wherein the output converting unit pre-stores a mapping relation of a plurality of fingerprint data and a plurality of output characters, wherein one of the output characters is outputted, by the output converting unit in response to a received fingerprint data coming from the first fingerprint recognition device.

15. An input suite, comprising:
- a keyboard and a computer mouse, wherein the computer mouse comprises at least one first fingerprint recognition device disposed on an outside surface of the computer mouse, and configured to recognize fingerprint data, wherein an output converting unit is connected to the first fingerprint recognition device;
- wherein a mapping relation of a plurality of fingerprint data and a plurality of output characters is pre-stored in the output converting unit, and an output character is outputted, by the output converting unit, in response to a received fingerprint data coming from the first fingerprint recognition device; and
- wherein the keyboard is configured to output a portion of English letters, and the computer mouse is configured to output the remaining portion of the English letters and/or all numeric numbers in response to different fingerprints.

\* \* \* \* \*